(12) United States Patent
Sriskandha et al.

(10) Patent No.: US 11,787,944 B2
(45) Date of Patent: Oct. 17, 2023

(54) PIGMENTED POLYMER PARTICLES AND METHODS OF PRODUCTION AND USES THEREOF

(71) Applicant: Xerox Corporation, Norwalk, CT (US)

(72) Inventors: Shivanthi Easwari Sriskandha, Mississauga (CA); Valerie M. Farrugia, Oakville (CA); Richard Philip Nelson Veregin, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 198 days.

(21) Appl. No.: 17/104,275

(22) Filed: Nov. 25, 2020

(65) Prior Publication Data
US 2022/0162446 A1 May 26, 2022

(51) Int. Cl.
*C08J 3/21* (2006.01)
*C08J 3/12* (2006.01)
(Continued)

(52) U.S. Cl.
CPC ............ *C08L 83/04* (2013.01); *C08J 3/12* (2013.01); *C08J 3/20* (2013.01); *C09D 183/04* (2013.01);
(Continued)

(58) Field of Classification Search
None
See application file for complete search history.

(56) References Cited

U.S. PATENT DOCUMENTS 3,035,003 A     5/1962  Ferdinand
4,833,060 A  *  5/1989  Nair .......................... C08J 3/14
                                                            523/333
(Continued)

FOREIGN PATENT DOCUMENTS

CA        2776056 A1  * 11/2012
CN      101970557 A   *  2/2011
(Continued)

OTHER PUBLICATIONS 2 page brochure for a definition for span of a particle size. Downloaded on May 20, 2023.*
(Continued)

*Primary Examiner* — Tae H Yoon
(74) *Attorney, Agent, or Firm* — Vorys, Sater, Seymour and Pease LLP

(57) ABSTRACT

Pigmented polymer particles may comprise a thermoplastic polymer and a pigment, wherein at least some of the pigmented polymer particles have a morphology according to (a), (b), (c), or any combination thereof: (a) the pigment having a coating comprising the thermoplastic polymer and the coated pigment adhered to a thermoplastic polymer particle, (b) the pigment being embedded in an outer surface of the thermoplastic polymer particle, and (c) the pigment being encapsulated by the thermoplastic polymer particle. The pigmented polymer particles, especially the highly spherical pigmented polymer particles, may be useful, among other things, as starting material for additive manufacturing. For example, a method may comprise: depositing, upon a surface, the foregoing pigmented polymer particles optionally in combination with other thermoplastic polymer particles; and once deposited, heating at least a portion of the particles to promote consolidation thereof and form a consolidated body.

10 Claims, 5 Drawing Sheets

(51) Int. Cl.
*C08L 83/04* (2006.01)
*C09D 183/04* (2006.01)
*C08J 3/20* (2006.01)

(52) U.S. Cl.
CPC ........ *C08J 2323/12* (2013.01); *C08J 2483/04* (2013.01)

(56) References Cited

U.S. PATENT DOCUMENTS

| | | | |
|---|---|---|---|
| 4,863,646 A * | 9/1989 | Watanabe | C08J 3/12 264/9 |
| 5,302,486 A * | 4/1994 | Patel | G03G 9/09371 430/110.2 |
| 5,859,075 A | 1/1999 | Shukla et al. | |
| 7,740,938 B2 | 6/2010 | Helft et al. | |
| 8,822,555 B2 | 9/2014 | Kaiso et al. | |
| 10,655,025 B2 | 5/2020 | Farrugia et al. | |
| 2002/0128356 A1 | 9/2002 | Nakamura | |
| 2010/0266949 A1 | 10/2010 | Lai | |
| 2011/0229545 A1 | 9/2011 | Shum et al. | |
| 2015/0152214 A1 | 6/2015 | Uenlue | |
| 2016/0375676 A1 | 12/2016 | Ritchie et al. | |
| 2017/0129177 A1 | 5/2017 | Hattig et al. | |
| 2019/0022930 A1 | 1/2019 | Hinch et al. | |
| 2019/0039294 A1 | 2/2019 | Stasiak | |

FOREIGN PATENT DOCUMENTS

| | | |
|---|---|---|
| CN | 104194326 | 12/2014 |
| EP | 0 866 088 A | 9/1998 |
| FR | 2939075 | 6/2010 |
| JP | H08504183 A * | 5/1996 |
| JP | 2002080629 A | 3/2002 |
| WO | WO 2004067609 A1 * | 8/2004 |
| WO | 2015/109143 A | 7/2015 |

OTHER PUBLICATIONS

H. Patil, et al. Hot-melt extrusion: from theory to application in pharmaceutical applicaitons, AAPS PharmSciTech, vol. 17, No. 1, pp. 20-42, Feb. 2016.
J. Sundararaj, et al. Drop breakup and coalescence in polymer blends: the effects of concentration and compatibilization, Macromolecules 1995, 28, 2647-2657.
R G Kleijnen, et al., Production and Processing of a Spherical Polybutylene Terephthalate Powder for Laser Sintering, Appl. Sci. 2019, 9(7), 1308.
I. Pillin, et al. Crystallization kinetics of poly(butylene terephthalate) (PBT): Influence of additives and free carboxylic acid chain ends. Polym. Eng. Sci. 2001, 41, 178-191.
S Fanselow, et al. AIP Conference Proceedings 1713, 140007 (2016)—Production of micron-sized polymer particles for additive manufacturing by melt emulsification.
M Schmid, et al., AIP Conference Proceedings 1664, 160009 (2015)—Polymer powders for selective laser sintering (SLS).
M Schmid, et al., Additive Manufacturing: Polymers Applicable for Laser Sintering (LS), Procedia Engineering 149 (2016) 457-464.
Marius Sachs et al; "Characterization of a downer reactor for particle rounding;" Powder Technology vol. 316, Jul. 1, 2017.

* cited by examiner

PIGMENTED POLYMER PARTICLES AND METHODS OF PRODUCTION AND USES THEREOF

TECHNICAL FIELD

The present disclosure relates to particles that comprise pigments and a thermoplastic polymer. Said particles are referred to as pigmented polymer particles. The present disclosure further relates to the methods of making and using such pigmented polymer particles.

BACKGROUND

Thermoplastic polymers are often used to make extruded objects like films, bags, particles, and filaments. Many thermoplastic polymers are off-white colored polymers that have the ability to withstand elevated temperatures and/or low temperatures without loss of physical properties. Therefore, objects formed with thermoplastic polymers can be used in demanding applications like power tools, automotive parts, gears, and appliance parts. In some instances, the application may call for the thermoplastic polymer-made part to be colored or have other visible identifiers like phosphorescence. For example, phosphorescence, a color pattern, or a color combination can be used to identify parts as an anti-counterfeiting measure.

Because pigments are particulates, pigments can be difficult to homogeneously mix in the thermoplastic polymers. One application where homogeneous incorporation of pigments is especially important is the rapidly growing technology area of three-dimensional (3-D) printing, also known as additive manufacturing. Although 3-D printing has traditionally been used for rapid prototyping activities, this technique is being increasingly employed for producing commercial and industrial objects, which may have entirely different structural and mechanical tolerances than do rapid prototypes.

3-D printing operates by depositing either (a) small droplets or streams of a melted or solidifiable material or (b) powder particulates in precise deposition locations for subsequent consolidation into a larger object, which may have any number of complex shapes. Such deposition and consolidation processes typically occur under the control of a computer to afford layer-by-layer buildup of the larger object. In a particular example, consolidation of powder particulates may take place in a 3-D printing system using a laser to promote selective laser sintering (SLS).

SUMMARY OF THE INVENTION

The present disclosure relates to pigmented polymer particles and the methods of making and using such particles. The pigmented polymer particles described herein, especially the highly spherical pigmented polymer particles, may be useful, among other things, as starting material for additive manufacturing. Further, the visual properties (e.g., color, combination of colors, phosphorescence, and the like) may be used for identifying objects, tracking objects, authenticating objects, and/or determining the health of objects made from the pigmented polymer particles.

Disclosed herein are compositions that comprise: pigmented polymer particles comprising a thermoplastic polymer and a pigment having a melt-emulsified morphology.

Disclosed herein are compositions that comprise: pigmented polymer particles comprising a thermoplastic polymer and a pigment, wherein at least some of the pigmented polymer particles have a morphology according to (a), (b), (c), or any combination thereof: (a) the pigment having a coating comprising the thermoplastic polymer and the coated pigment adhered to a thermoplastic polymer particle, (b) the pigment being embedded in an outer surface of the thermoplastic polymer particle, and (c) the pigment being encapsulated by the thermoplastic polymer particle.

Disclosed herein are methods that comprise: depositing, upon a surface, the either or both of the foregoing pigmented polymer particles optionally in combination with other thermoplastic polymer particles; and once deposited, heating at least a portion of the particles to promote consolidation thereof and form a consolidated body.

Disclosed herein are methods that comprise: mixing a mixture comprising a thermoplastic polymer, a carrier fluid that is immiscible with the thermoplastic polymer, a pigment, and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form pigmented polymer particles comprising a thermoplastic polymer and a pigment having a melt-emulsified morphology; and separating the pigmented polymer particles from the carrier fluid.

Disclosed herein are methods that comprise: mixing a mixture comprising a thermoplastic polymer, a carrier fluid that is immiscible with the thermoplastic polymer, a pigment, and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form pigmented polymer particles comprising a thermoplastic polymer and a pigment, wherein at least some of the pigmented polymer particles have a morphology according to (a), (b), (c), or any combination thereof: (a) the pigment having a coating comprising the thermoplastic polymer and the coated pigment adhered to a thermoplastic polymer particle, (b) the pigment being embedded in an outer surface of the thermoplastic polymer particle, and (c) the pigment being encapsulated by the thermoplastic polymer particle; and separating the pigmented polymer particles from the carrier fluid.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
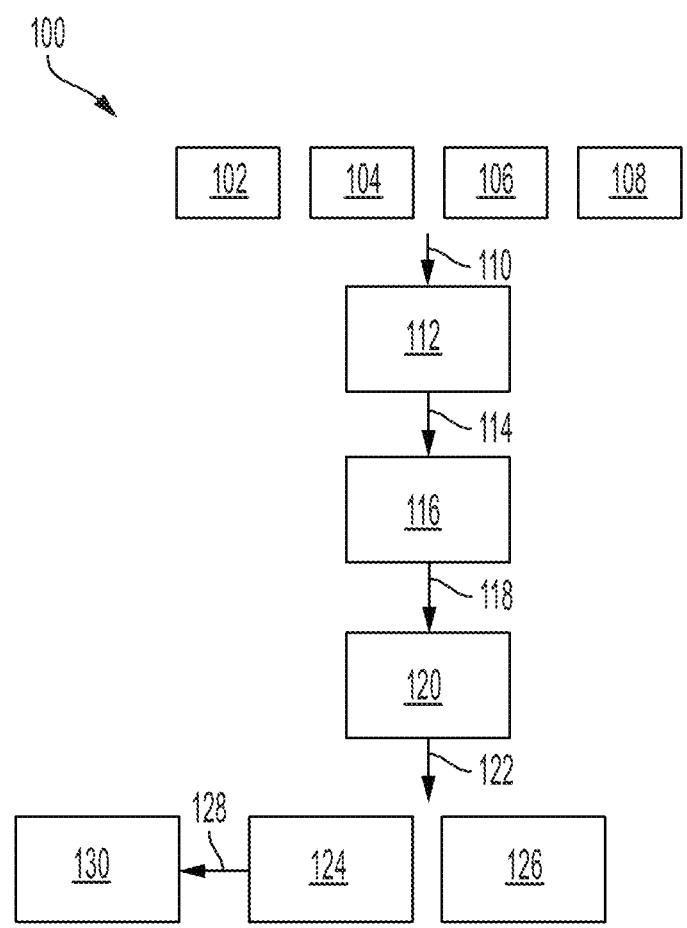
FIG. 1 is a flow chart of a nonlimiting example method 100 of the present disclosure.

Three-dimensional (3-D) printing, also known as additive manufacturing, is a rapidly growing technology area. Although 3-D printing has traditionally been used for rapid prototyping activities, this technique is being increasingly employed for producing commercial and industrial objects, which may have entirely different structural and mechanical tolerances than do rapid prototypes.

The present disclosure relates to polymer particles that comprise pigments and a thermoplastic polymer. Said particles are referred to as pigmented polymer particles. The pigmented polymer particles may include particles having a morphology according to (a), (b), (c), or any combination thereof: (a) the pigment having a coating comprising the thermoplastic polymer and the coated pigment adhered to a thermoplastic polymer particle, (b) the pigment being embedded in an outer surface of the thermoplastic polymer particle, and (c) the pigment being encapsulated by the thermoplastic polymer particle.

The pigmented polymer particles described herein, especially the highly spherical pigmented polymer particles, may be useful, among other things, as starting material for additive manufacturing. Further, the color and/or phosphorescence imparted by the pigments can be used for identifying objects, tracking objects, authenticating objects, and/or determining the health of objects made from the pigmented polymer particles.

Definitions and Test Methods

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "pigment" refers to a particle that absorbs and/or refracts ultraviolet or visible light.

As used herein, the term "phosphorescence" and grammatical variations thereof refer to luminescence that persists at least 10 nanoseconds after the exciting cause (e.g., broad spectrum light, ultraviolet wavelength lights of light, a specific wavelength of light, or the like) is removed.

As used herein, a "phosphorescent pigment" is a pigment that when exposed to an exciting cause will phosphoresce.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the term "embed" relative to particles (e.g., nanoparticles and/or pigments) and a surface of a polymer particle refers to the particle being at least partially extending into the surface of the polymer particle such that polymer is in contact with the nanoparticle to a greater degree than would be if the nanoparticle were simply laid on the surface of the polymer particle.

As used herein, the term "encapsulated" relative to particles (e.g., nanoparticles and/or pigments) and polymer particles refers to the particle being enclosed by the polymer particle. That is, portions of said particles (e.g., nanoparticles and/or pigments) do not extend beyond the surface of the polymer particle. The term "encapsulate" does not imply a degree to which the surface of the particle (e.g., nanoparticles and/or pigments) surface is contact with polymer. For example, the particle (e.g., nanoparticles and/or pigments) may be at least partially in a void within the polymer particle and only a portion of the surface of the particle be in contact with the polymer.

Herein, D10, D50, D90, and diameter span are primarily used herein to describe particle sizes. As used herein, the term "D10" refers to a diameter at which 10% of the sample (on a volume basis unless otherwise specified) is comprised of particles having a diameter less than said diameter value. As used herein, the term "D50" refers to a diameter at which 50% of the sample (on a volume basis unless otherwise specified) is comprised of particles having a diameter less than said diameter value. As used herein, the term "D90" refers to a diameter at which 90% of the sample (on a volume basis unless otherwise specified) is comprised of particles having a diameter less than said diameter value.

As used herein, the terms "diameter span" and "span" and "span size" when referring to diameter provides an indication of the breadth of the particle size distribution and is calculated as (D90–D10)/D50 (again each D-value is based on volume, unless otherwise specified).

Particle size can be determined by light scattering techniques using a Malvern MASTERSIZER™ 3000 or analysis of optical digital micrographs. Unless otherwise specified, light scattering techniques are used for analyzing particle size.

For light scattering techniques, the control samples were glass beads with a diameter within the range of 15 μm to 150 μm under the tradename Quality Audit Standards QAS4002™ obtained from Malvern Analytical Ltd. Samples were analyzed as dry powders, unless otherwise indicated. The particles analyzed were dispersed in air and analyzed using the AERO S dry powder dispersion module with the MASTERSIZER™ 3000. The particle sizes were derived using instrument software from a plot of volume density as a function of size.

Particle size measurement and diameter span can also be determined by optical digital microscopy. The optical images are obtained using a Keyence VHX-2000 digital microscope using version 2.3.5.1 software for particle size analysis (system version 1.93).

As used herein, when referring to sieving, pore/screen sizes are described per U.S.A. Standard Sieve (ASTM E11-17).

As used herein, the terms "circularity" and "sphericity" relative to the particles refer to how close the particle is to a perfect sphere. To determine circularity, optical microscopy images are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., polydimethylsiloxane oil), the kinematic viscosity data cited herein was provided by the manufacturer, whether measured according to the foregoing ASTM or another standard measurement technique.

Pigmented Polymer Particles and Methods of Making

The methods and compositions described herein relate to pigmented polymer particles. The pigments are included in the melt emulsion production of the pigmented polymer particles. Pigmented polymer particles may comprise polymer particles that include a pigment and a thermoplastic polymer. Depending on, among other things, the pigment composition, the thermoplastic polymer composition, and the melt emulsification process parameters, the morphology of the pigmented polymer particles may vary. For example, the thermoplastic polymer may form a coating on the pigment, and the coated pigment may adhere to the surface of a thermoplastic polymer particle. In another example, the pigment may become embedded in a surface of the thermoplastic polymer particle. In such instances, the pigment embedded in the thermoplastic polymer particle may or may not have a coating comprising the thermoplastic polymer. In yet another example morphology, the pigment may become encapsulated in the thermoplastic polymer particle. Any combination of the foregoing may also be present and may be referred to herein as melt-emulsification morphologies. Further, the compositions and methods described herein do not require that all thermoplastic polymer particles have a pigment accompanying a thermoplastic polymer particle. That is, the compositions produced and methods described herein may include a mixture of particles that include one or more of: (a) thermoplastic polymer particles (i.e., particles comprising the thermoplastic polymer) having no pigment associated therewith (e.g., a thermoplastic polymer particle not having a pigment adhered thereto, embedded therein, or encapsulated thereby), (b) pigmented polymer particles that include pigments and a thermoplastic polymer having a melt-emulsified morphology, and (c) thermoplastic polymer coated pigment not associated with thermoplastic polymer particles (e.g., thermoplastic polymer coated pigment not adhered to, embedded in, or encapsulated by a thermoplastic polymer particle). The (b) pigmented polymer particles that include pigments and a thermoplastic polymer having a melt-emulsified morphology may include one or more of: (b1) thermoplastic polymer particles having pigment adhered thereto via the polymer (e.g., the pigment having a coating comprising the thermoplastic polymer and the coated pigment is adhered to an outer surface of a thermoplastic polymer particle), (b2) thermoplastic polymer particles having pigment embedded in a surface of the polymer particles, and (b3) thermoplastic polymer particles having pigment encapsulated in the polymer particles, where a single particle may have any combination of (b1), (b2), and (b3).

Without being limited by theory, it is believed that the melt emulsification process creates a more intimate combination between the thermoplastic polymer and the pigment, which allows for the pigment to more readily associate, by one or more of a variety of morphologies, with a polymer particle. The pigmented polymer particles having a melt-emulsified morphology may improve the integrity (e.g., reduced void space and/or less deformation) of the resultant SLS additive manufactured article while also providing comparable color and/or phosphorescence as compared to an admix of pigment and polymer particles.

FIG. 1 is a flow chart of a nonlimiting example method 100 of the present disclosure. Thermoplastic polymer 102, carrier fluid 104, optionally emulsion stabilizer 106, and pigment 108 are combined 110 to produce a mixture 112. The components 102, 104, 106, and 108 can be added in any order and include mixing and/or heating during the process of combining 110 the components 102, 104, 106, and 108.

The mixture 112 is then processed 114 by applying sufficiently high shear to the mixture 112 at a temperature greater than the melting point or softening temperature of the thermoplastic polymer 102 to form a melt emulsion 116. Because the temperature is above the melting point or softening temperature of the thermoplastic polymer 102, the thermoplastic polymer 102 becomes a polymer melt. The shear rate should be sufficient enough to disperse the polymer melt in the carrier fluid 104 as droplets (i.e., the polymer emulsion 116). Without being limited by theory, it is believed that, all other factors being the same, increasing shear should decrease the size of the droplets of the polymer melt in the carrier fluid 104. However, at some point there may be diminishing returns on increasing shear and decreasing droplet size or there may be disruptions to the droplet contents that decrease the quality of particles produced therefrom.

The melt emulsion 116 inside and/or outside the mixing vessel is then cooled 118 to solidify the polymer droplets into pigmented polymer particles 124 (also referred to as solidified pigmented polymer particles). The thermoplastic polymer particles 124 comprise a thermoplastic polymer. At least some of the pigmented polymer particles 124/130 comprise the thermoplastic polymer (composed of the thermoplastic polymer 102) and pigment 108 $a$ having a melt-emulsified morphology. The melt-emulsified morphology may comprises at least one of the following: (a) the pigment having a coating comprising the thermoplastic polymer and the coated pigment is adhered to an outer surface of a thermoplastic polymer particle (i.e., particles that comprise the thermoplastic particle), (b) the pigment being embedded in an outer surface of a thermoplastic polymer particle, and (c) the pigment being encapsulated by a thermoplastic polymer particle, where a single pigmented polymer particle may have any combination of (a), (b), and (c). Preferably, the pigmented polymer particles 124/130 include particles having morphologies according to (b) and/or (c). Further, as described above, other components of the product in addition to the pigmented polymer particles 124 may include pigment 108 coated in the thermoplastic polymer 102 but not associated with a polymer particle and/or polymer particles without pigment 108 associated therewith.

The cooled mixture 120 can then be treated 122 to isolate the pigmented polymer particles 124 from other components 126 (e.g., the carrier fluid 104, excess emulsion stabilizer 106, and the like) and wash or otherwise purify the pigmented polymer particles 124. The pigmented polymer particles 124 comprise the thermoplastic polymer 102 and the pigment 108 including particles with a melt-emulsified morphology, and, when included, at least a portion of the emulsion stabilizer 106 coating the outer surface of the pigmented polymer particles 124. Further, the emulsion stabilizer 106 may coat at least a portion of a polymer coating of the pigment 108, when coated pigment is produced. Emulsion stabilizers 106, or a portion thereof, may be deposited as coating, perhaps a uniform coating, on the pigmented polymer particles 124 (and coated pigment, when produced). In some instances, which may be dependent upon non-limiting factors such as the temperature (including cooling rate), the type of thermoplastic polymer 102, and the types and sizes of emulsion stabilizers 106, the nanoparticles of emulsion stabilizers 106 may become at least partially embedded within the outer surface of pigmented polymer particles 124. Even without embedment taking place, at least a portion of the nanoparticles within emulsion stabilizers 106 may remain robustly associated with pigmented polymer particles 124 to facilitate their further use. In contrast, dry blending already formed thermoplastic polymer particulates (e.g., formed by cryogenic grinding or precipitation processes) with a flow aid like silica nanoparticles does not result in a robust, uniform coating of the flow aid upon the thermoplastic polymer particulates (and coated pigment, when produced).

The pigmented polymer particles 124 may optionally be further purified 128 (described in more detail below) to yield purified pigmented polymer particles 130.

The thermoplastic polymer 102 and carrier fluid 104 should be chosen such that at the various processing temperatures (e.g., from room temperature to process temperature) the thermoplastic polymer 102 and carrier fluid 104 are immiscible. An additional factor that may be considered is the differences in (e.g., a difference or a ratio of) viscosity at process temperature between the molten thermoplastic polymer 102 and the carrier fluid 104. The differences in viscosity may affect droplet breakup and particle size distribution. Without being limited by theory, it is believed that when the viscosities of the molten thermoplastic polymer 102 and the carrier fluid 104 are too similar, the circularity of the product as a whole may be reduced where the particles are more ovular and more elongated structures are observed.

Examples of thermoplastic polymers 102 include, but are not limited to, polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems of the present disclosure.

The thermoplastic polymers 102 in the compositions and methods of the present disclosure may be elastomeric or non-elastomeric. Some of the foregoing examples of thermoplastic polymers 102 may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in Handbook of Thermoplastic Elastomers, 2nd ed., B. M. Walker and C. P. Rader, eds., Van Nostrand Reinhold, New York, 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, and the like, and any combination thereof. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is [NH—(CH$_2$)$_6$—NH—CO—(CH$_2$)$_8$—CO]$_n$. A polyamide followed by number(s) backslash number(s) are a copolymer of the polyamides indicated by the numbers before and after the backslash.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly[4,4'-methylenebis(phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Compatibilizers may optionally be used to improve the blending efficiency and efficacy thermoplastic polyester with one or more thermoplastic polymers. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

The thermoplastic polymers 102 may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The thermoplastic polymers 102 may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The thermoplastic polymers 102 may optionally comprise an additive. Typically, the additive would be present before addition of the thermoplastic polymers 102 to the mixture 110. Therefore, in the thermoplastic polymer melt droplets and resultant thermoplastic polymer particles, the additive is dispersed throughout the thermoplastic polymer. Accordingly, for clarity, this additive is referred to herein as an "internal additive." The internal additive may be blended with the thermoplastic polymer just prior to making the mixture 110 or well in advance.

When describing component amounts in the compositions described herein (e.g., the mixture 112 and pigmented polymer particles 124), a weight percent based on the thermoplastic polymer 102 not inclusive of the internal additive. For example, a composition comprising 1 wt % of emulsion stabilizer by weight of 100 g of a thermoplastic polymer 102 comprising 10 wt % internal additive and 90 wt % thermoplastic polymer is a composition comprising 0.9 g of emulsion stabilizer, 90 g of thermoplastic polymer, and 10 g of internal additive.

The internal additive may be present in the thermoplastic polymer 102 at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer 102. For example, the thermoplastic polymer 102 may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof.

The thermoplastic polymer 102 may be present in the mixture 112 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the thermoplastic polymer 102 and carrier fluid 104 combined.

Suitable carrier fluids 104 have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt).

Examples of carrier fluids 104 include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. When the carrier fluid 104 comprises two or more of the foregoing, the carrier fluid 104 may have one or more phases. For example, polysiloxanes modified with fatty acids and polysiloxanes modified with fatty alcohols (preferably with similar chain lengths for the fatty acids and fatty alcohols) may form a single-phase carrier fluid 104. In another example, a carrier fluid 104 comprising a silicone oil and an alkyl-terminal polyethylene glycol may form a two-phase carrier fluid 104.

The carrier fluid 104 may be present in the mixture 112 at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the thermoplastic polymer 102 and carrier fluid 104 combined.

In some instances, the carrier fluid 104 may have a density of about 0.6 g/cm$^3$ to about 1.5 g/cm$^3$, and the thermoplastic polymer 102 has a density of about 0.7 g/cm$^3$ to about 1.7 g/cm$^3$, wherein the thermoplastic polymer has a density similar, lower, or higher than the density of the carrier fluid.

Pigment 108 should be sufficiently stable to not decompose at the processing 114 temperatures. Pigments may impart a color, a metallic color, a pearlescent color, and/or a phosphorescent color particles. Examples of metallic and/or phosphorescent pigments include, but are not limited to, synthetic mica (e.g., fluorphlogopite), natural mica (e.g., muscovite), talc, sericite, kaolin, glass, $SiO_2$ flakes, $Al_2O_3$ flakes, glass flakes, acicular pigments (e.g., BiOCl, colored glass fibers, α-$Fe_2O_3$, and α-FeOOH), $CaSO_4$, iron oxides, chromium oxides, carbon black, metal effect pigments (e.g., Al flakes and bronzes), optically variable pigments (OVPs), liquid crystal polymer pigments (LCPs), holographic pigments, titanium dioxide, titanium suboxides, titanium oxynitrides, $Al_2O_3$, $Fe_2O_3$, $Fe_3O_4$, $SnO_2$, $Cr_2O_3$, ZnO, CuO, NiO, zirconium oxide, iron titanium oxides (iron titanates), other metal oxides, and the like, and any combination thereof. Examples of phosphorescent pigments include, but are not limited to, zinc sulfide-based pigments (e.g., zinc sulfide doped with copper and/or manganese); strontium aluminate-based pigments (e.g., $SrAl_2O_4$ doped with Eu and Dy, $Sr_4Al_{14}O_{25}$ doped with Eu and Dy); strontium silicate-based pigments (e.g., $Sr_2MgSi_2O_7$ doped with Dy and Eu, commercially available as P170 SPS BLUE from USR Optonix Inc); cadmium sulfide-based pigments; phosphorous silicate-based pigments; phosphorous aluminate-based pigments; calcium silicate-based pigments; calcium aluminate-based pigments (e.g., $CaAl_2O_4$ doped with Eu and Nd); titanium aluminate-based pigment; titanium-based aluminosilicate-based pigments; magnesium aluminate-based pigments; barium aluminate-based pigments; and the like; and any combination thereof.

Examples of commercially available surface treated metallic and/or phosphorescent pigments include, but are not limited to, REFLEX™ pigments (synthetic mica-based pearlescent pigments, available from CQV), IRIODIN™ (mica-based, metal oxide-coated pearlescent pigments, available from Merck) (e.g., IRIODIN™ 300 "Gold Pearl" and IRIODIN™ 100 "Silver Pearl"), SUNGEM™ (glass platelet-based pigments, available from Sun Chemical), SUNMICA™ (mica-based pigments, available from Sun Chemical), SYNCRYSTAL™ (metal oxide coated synthetic fluorphlogopite flakes, available from Eckart), and the like, and any combination thereof. Other metallic color pearlescent pigments from Merck include TIMIRON® Bronze MP60 with a D50 volume average particle size (50% of the pigments have a volume size of less than the stated size) of 22-37 microns, TIMIRON® Copper MP-65 D50 size of 22-37 microns, COLORONA® Oriental Beige D50 size of 3-10 microns, COLORONA® Aborigine Amber D50 size of 18-25 microns, COLORONA® Passion Orange with D50 size of 18-25 microns, COLORONA® Bronze Fine of D50 size of 7-14, COLORONA® Bronze with D50 size of 18-25 microns, COLORONA® Bronze Sparkle of D50 size of 28-42 microns, COLORONA® Copper Fine with D50 size of 7-14 microns, COLORONA® Copper with D50 size of 18-25, COLORONA® Copper Sparkle with D50 size of 25-39 microns, COLORONA® Red Brown with D50 size of 18-25 microns, COLORONA® Russet with D50 size of 18-25 microns, COLORONA® Tibetan Ochre with D50 size of 18-25 microns, COLORONA® Sienna Fine with D50 size of 7-14 microns, COLORONA® Sienna with D50 size of 18-25 microns, COLORONA® Bordeaux with D50 size of 18-25 microns, COLORONA® Glitter Bordeaux, COLORONA® Chameleon with D50 size of 18-25 microns. Also suitable are Merck mica based pigments with metal oxide particle coatings such as the Merck silvery white pigments including TIMIRON® Super Silk MP-1005 with D50 size of 3-10 microns, TIMIRON® Super Sheen MP-1001 with D50 size of 7-14 microns, TIMIRON® Super Silver Fine with D50 size of 9-13 microns, TIMIRON® Pearl Sheen MP-30 with D50 size of 15-21 microns, TIMIRON® Satin MP-11171 with D50 size of 11-20 microns, TIMIRON® Ultra Luster MP-111 with D50 size of 18-25 microns, TIMIRON® Star Luster MP-111 with D50 size of 18-25 microns, TIMIRON® Pearl Flake MP-10 with D50 size of 22-37 microns, TIMIRON® Super Silver with D50 size of 17-26 microns, TIMIRON® Sparkle MP-47 with D50 size of 28-38 microns, TIMIRON® Arctic Silver with D50 size of 19-25 microns, XIRONA® Silver with D50 size of 15-22 microns, RONASTAR® Silver with D50 size of 25-45 microns, and the like, and any combination thereof. For very bright colors, examples from Merck include COLORONA® Carmine Red with D50 size of 10-60 microns giving a Red lustrous effect, COLORONA® Magenta with D50 size of 18-25 microns, giving a pink-violet lustrous effect, COLORONA® Light Blue with D50 size of 18-25 microns, to give a light blue lustrous effect, COLORONA® Dark Blue with D50 size of 18-25 microns to give a dark blue lustrous effect, COLORONA® Majestic Green with 18-25 microns to give a green lustrous color, COLORONA® Brilliant Green of D5 19-26 microns to give a Green-golden lustrous color, COLORONA® Egyptian Emerald of D50 18-25 microns to give a dark green lustrous effect, COLORONA® Patagonian Purple of 18-25 microns size to give a purple lustrous effect, and the like, and any combination thereof. Mica based special effect pigments having a D50 from about 18 microns to about 50 microns from Eckart may also be used, such as DORADO® PX 4001, DORADO® PX 4261, DORADO® PX 4271, DORADO® PX 4310, DORADO® PX 4331, DORADO® PX 4542, PHOENIX® XT, PHOENIX® XT 2001, PHOENIX® XT 3001, PHOENIX® XT 4001, PHOENIX® XT 5001, PHOENIX® PX 1000, PHOENIX® PX 1001, PHOENIX® PX 1221, PHOENIX® PX 1231, PHOENIX® PX 1241, PHOENIX® PX 1251, PHOENIX® PX 1261, PHOENIX® PX 1271, PHOENIX® PX 1310, PHOENIX® PX 1320, PHOENIX® PX 1502, PHOENIX® PX 1522, PHOENIX® PX 1542, PHOENIX® PX 2000, PHOENIX® PX 2000 L, PHOENIX® PX 2001, PHOENIX® PX 2011, PHOENIX® PX 2021, PHOENIX® PX 2221, PHOENIX® PX 2231, PHOENIX® PX 2241, PHOENIX® PX 2251, PHOENIX® PX 2261, PHOENIX® PX 2271, PHOENIX® PX 3001, PHOENIX® PX 4000, PHOENIX® PX 4001, PHOENIX® PX 4221, PHOENIX® PX 4231, PHOENIX® PX 4241, PHOENIX® PX 4251, PHOENIX® PX 4261, PHOENIX® PX 4271, PHOENIX® PX 4310, PHOENIX® PX 4320, PHOENIX® PX 4502, PHOENIX® PX 4522, PHOENIX® PX 4542, PHOENIX® PX 5000, PHOENIX® PX 5001, PHOENIX® PX 5310, PHOENIX® PX 5331, and the like, and any combination thereof. Special effect pigments such as Silberline aluminum flake pigments may be used, such as 16 micron DF-1667, 55 micron DF-2750, 27 micron DF-3500, 35 micron DF-3622, 15 micron DF-554, 20 micron DF-L-520AR, 20 micron LED-1708AR, 13 micron LED-2314AR, 55 micron SILBERCOTE™ PC 0452Z, 47 micron SILBERCOTE™ PC 1291X, 36 micron SILBERCOTE™, 36 micron SILBERCOTE™ PC 3331X, 31 micron SILBERCOTE™ PC 4352Z, 33 micron SILBERCOTE™ PC 4852X, 20 micron SILBERCOTE™ PC 6222X, 27 micron SILBERCOTE™ PC 6352Z, 25 micron SILBERCOTE™ PC 6802X, 14 micron SILBERCOTE™ PC 8152Z, 14 micron SILBERCOTE™ PC 8153X, 16 micron SILBERCOTE™ PC 8602X, 20 micron SILVET®/SILVEX® 890 Series, 16 micron SILVET®/SILVEX® 950 Series, and the like, and any combination thereof.

Pigments may have an average diameter (or D50) of about 1 micron to about 500 microns (or about 1 micron to about 25 microns, or about 5 microns to about 50 microns, or about 25 microns to about 200 microns, or about 100 microns to about 300 microns, or about 250 microns to about 500 microns).

The pigmented polymer particles of the present disclosure may include the pigment (or cumulative pigments if more than one is used) at about 0.01 wt % to about 30 wt % (or about 0.01 wt % to about 1 wt %, or about 0.1 wt % to about 5 wt %, or about 1 wt % to about 10 wt %, or about 5 wt % to about 20 wt %, or about 10 wt % to about 30 wt %) of the thermoplastic polymer 102.

The pigmented polymer particles may comprise one or more pigments. The composition and concentration of the pigments may be used for identifying objects, tracking objects, authenticating objects, and/or determining the health of objects made from the pigmented polymer particles. That is, the pigments may be used as a fingerprint for identifying objects, tracking objects, and/or authenticating objects. Further or alternatively, the pigments may be used as an indicator for a portion of the object as a way of identifying defects (e.g., cracks or wear) and/or the extent of such defects.

The emulsion stabilizers used in the methods and compositions of the present disclosure may comprise nanoparticles (e.g. oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 $m^2/g$), AEROSIL® RX50 (about 40 nm average diameter silica nanoparticles having a hydrophobically modified surface and a BET surface area of 35±10 m²/g), AEROSIL® 380 (silica nanoparticles having a hydrophilically modified surface and a BET surface area of 380±30 m²/g), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

The nanoparticles may have an average diameter (D50 based on volume) of about 1 nm to about 500 nm (or about 10 nm to about 150 nm, or about 25 nm to about 100 nm, or about 100 nm to about 250 nm, or about 250 nm to about 500 nm).

The nanoparticles may have a BET surface area of about 10 m²/g to about 500 m²/g (or about 10 m²/g to about 150 m²/g, or about 25 m²/g to about 100 m²/g, or about 100 m²/g to about 250 m²/g, or about 250 m²/g to about 500 m²/g).

Nanoparticles may be included in the mixture 112 at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the thermoplastic polymer 102.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture 112 at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the polyamide 102. Alternatively, the mixture 112 may comprise no (or be absent of) surfactant.

A weight ratio of nanoparticles to surfactant may be about 1:10 to about 10:1 (or about 1:10 to about 1:1, or about 1:5 to about 5:1, or about 1:1 to about 10:1).

As described above, the components 102, 104, and 106 can be added in any order and include mixing and/or heating during the process of combining 110 the components 102, 104, and 106. For example, the emulsion stabilizer 106 may first be dispersed in the carrier fluid 104, optionally with heating said dispersion, before adding the thermoplastic polymer 102. In another nonlimiting example, the thermoplastic polymer 102 may be heated to produce a polymer melt to which the carrier fluid 104 and emulsion stabilizer 106 are added together or in either order. In yet another nonlimiting example, the thermoplastic polymer 102 and carrier fluid 104 can be mixed at a temperature greater than the melting point or softening temperature of the thermoplastic polymer 102 and at a shear rate sufficient enough to disperse the thermoplastic polymer melt in the carrier fluid 104. Then, the emulsion stabilizer 106 can be added to form the mixture 112 and maintained at suitable process conditions for a set period of time.

Combining 110 the components 102, 104, and 106 in any combination can occur in a mixing apparatus used for the processing 114 and/or another suitable vessel. By way of nonlimiting example, the thermoplastic polymer 102 may be heated to a temperature greater than the melting point or softening temperature of the thermoplastic polymer 102 in the mixing apparatus used for the processing 114, and the emulsion stabilizer 106 may be dispersed in the carrier fluid 104 in another vessel. Then, said dispersion may be added to the melt of the thermoplastic polymer 102 in the mixing apparatus used for the processing 114.

The mixing apparatuses used for the processing 114 to produce the melt emulsion 116 should be capable of maintaining the melt emulsion 116 at a temperature greater than the melting point or softening temperature of the thermoplastic polymer 102 and applying a shear rate sufficient to disperse the polymer melt in the carrier fluid 104 as droplets.

Examples of mixing apparatuses used for the processing 114 to produce the melt emulsion 116 include, but are not limited to, extruders (e.g., continuous extruders, batch extruders, and the like), stirred reactors, blenders, reactors with inline homogenizer systems, and the like, and apparatuses derived therefrom.

Processing 114 and forming the melt emulsion 116 at suitable process conditions (e.g., temperature, shear rate, and the like) for a set period of time.

The temperature of processing 114 and forming the melt emulsion 116 should be a temperature greater than the melting point or softening temperature of the thermoplastic polymer 102 and less than the decomposition temperature of any components 102, 104, and 106 in the mixture 112. For example, the temperature of processing 114 and forming the melt emulsion 116 may be about 1° C. to about 50° C. (or about 1° C. to about 25° C., or about 5° C. to about 30° C., or about 20° C. to about 50° C.) greater than the melting point or softening temperature of the thermoplastic polymer 102 provided the temperature of processing 114 and forming the melt emulsion 116 is less than the decomposition temperature of any components 102, 104, and 106 in the mixture 112.

The shear rate of processing 114 and forming the melt emulsion 116 should be sufficiently high to disperse the polymer melt in the carrier fluid 104 as droplets. Said droplets should comprise droplets having a diameter of about 1000 μm or less (or about 1 μm to about 1000 μm, or about 1 μm to about 50 μm, or about 10 μm to about 100 μm, or about 10 μm to about 250 μm, or about 50 μm to about 500 μm, or about 250 μm to about 750 μm, or about 500 μm to about 1000 μm).

The time for maintaining said temperature and shear rate for processing 114 and forming the melt emulsion 116 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing 114 can be stopped. That time may depend on, among other things, the temperature, shear rate, thermoplastic polymer 102 composition, the carrier fluid 104 composition, and the emulsion stabilizer 106 composition.

The melt emulsion 116 may then be cooled 118. Cooling 118 can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 116. In some instances, the shear applied during heating may be applied during cooling.

The cooled mixture 120 resulting from cooling 118 the melt emulsion 116 comprises solidified pigmented polymer particles 124 and other components 126 (e.g., the carrier fluid 104, excess emulsion stabilizer 106, and the like). The thermoplastic polymer particles may be dispersed in the carrier fluid or settled in the carrier fluid.

The cooled mixture 120 may then be treated 122 to the separate pigmented polymer particles 124 from the other components 126. Suitable treatments include, but are not limited to, washing, filtering, centrifuging, decanting, and the like, and any combination thereof.

Solvents used for washing the pigmented polymer particles 124 should generally be (a) miscible with the carrier fluid 104 and (b) nonreactive (e.g., non-swelling and non-dissolving) with the thermoplastic polymer 102. The choice of solvent will depend on, among other things, the composition of the carrier fluid and the composition of the thermoplastic polymer 102.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the pigmented polymer particles 124 by drying using an appropriate method such as air-drying, heat-drying, reduced pressure drying, freeze drying, or a hybrid thereof. The heating may be performed preferably at a temperature lower than the glass transition point of the thermoplastic polymer (e.g., about 50° C. to about 150° C.).

Advantageously, carrier fluids and washing solvents of the systems and methods described herein (e.g., method 100) can be recycled and reused. One skilled in the art will recognize any necessary cleaning of used carrier fluid and solvent necessary in the recycling process.

The pigmented polymer particles 124 after separation from the other components 126 may optionally be further purified 128. For example, to narrow the particle size distribution (or reduce the diameter span), the pigmented polymer particles 124 can be passed through a sieve having a pore size of about 10 μm to about 250 μm (or about 10 μm to about 100 μm, or about 50 μm to about 200 μm, or about 150 μm to about 250 μm).

In another example purification technique, the pigmented polymer particles 124 may be washed with water to remove surfactant while maintaining substantially all of the nanoparticles associated with the surface of the pigmented polymer particles 124. In yet another example purification technique, the pigmented polymer particles 124 may be blended with additives to achieve a desired final product. For clarity, because such additives are blended with the thermoplastic particles 124 or other particles resultant from the methods described herein after the particles are solidified, such additives are referred to herein as "external additives." Examples of external additives include flow aids, other polymer particles, fillers, and the like, and any combination thereof.

In some instances, a surfactant used in making the pigmented polymer particles 124 may be unwanted in downstream applications. Accordingly, yet another example purification technique may include at least substantial removal of the surfactant from the pigmented polymer particles 124 (e.g., by washing and/or pyrolysis).

The pigmented polymer particles 124 and/or purified pigmented polymer particles 130 (referred to as pigmented polymer particles 124/130) may be characterized by composition, physical structure, and the like.

As described above, the emulsion stabilizers are at the interface between the polymer melt and the carrier fluid. As a result, when the mixture is cooled, the emulsion stabilizers remain at, or in the vicinity of, said interface. Therefore, the structure of the pigmented polymer particles 124/130 is, in general when emulsion stabilizers are used, includes emulsion stabilizers (a) dispersed on an outer surface of the pigmented polymer particles 124/130 and/or (b) embedded in an outer portion (e.g., outer 1 vol %) of the pigmented polymer particles 124/130.

Further, where voids form inside the polymer melt droplets, emulsion stabilizers 106 should generally be at (and/or embedded in) the interface between the interior of the void and the thermoplastic polymer. The voids generally do not contain the thermoplastic polymer. Rather, the voids may contain, for example, carrier fluid, air, or be void. The pigmented polymer particles 124/130 may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the pigmented polymer particles 124/130.

The thermoplastic polymer 102 may be present in the pigmented polymer particles 124/130 at about 90 wt % to about 99.5 wt % (or about 90 wt % to about 95 wt %, or about 92 wt % to about 97 wt %, or about 95 wt % to about 99.5 wt %) of the pigmented polymer particles 124/130.

When included, the emulsion stabilizers 106 may be present in the pigmented polymer particles 124/130 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the pigmented polymer particles 124/130. When purified to at least substantially remove surfactant or another emulsion stabilizer, the emulsion stabilizers 106 may be present in the particles 130/136 at less than 0.01 wt % (or 0 wt % to about 0.01 wt %, or 0 wt % to 0.001 wt %).

Upon forming thermoplastic particulates according to the disclosure herein using particulate emulsion stabilizers, at least a portion of the particulate emulsion stabilizers, such as silica nanoparticles, may be disposed as a coating upon the outer surface of the thermoplastic particulates (and coated pigment, when produced). At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the pigmented polymer particles 124/130 (and coated pigment, when produced). When purified to at least substantially remove surfactant or another emulsion stabilizer, the emulsion stabilizers 106 may be present in the particles 130/136 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 130/136. The coverage of the emulsion stabilizers 106 on an outer surface of the pigmented polymer particles 124/130 may be determined using image analysis of the scanning electron microscope images (SEM micrographs). The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the pigmented polymer particles 124/130 (and coated pigment, when produced). When purified to at least substantially remove surfactant or another emulsion stabilizer, the emulsion stabilizers 106 may be present in the particles 130/136 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 130/136. The coverage of the emulsion stabilizers 106 on an outer surface of the pigmented polymer particles 124/130 may be determined using image analysis of the SEM micrographs The pigmented polymer particles 124/130 may have a D10 of about 0.1 µm to about 125 µm (or about 0.1 µm to about 5 µm, about 1 µm to about 10 µm, about 5 µm to about 30 µm, or about 1 µm to about 25 µm, or about 25 µm to about 75 µm, or about 50 µm to about 85 µm, or about 75 µm to about 125 µm), a D50 of about 0.5 µm to about 200 µm (or about 0.5 µm to about 10 µm, or about 5 µm to about 50 µm, or about 30 µm to about 100 µm, or about 30 µm to about 70 µm, or about 25 µm to about 50 µm, or about 50 µm to about 100 µm, or about 75 µm to about 150 µm, or about 100 µm to about 200 µm), and a D90 of about 3 µm to about 300 µm (or about 3 µm to about 15 µm, or about 10 µm to about 50 µm, or about 25 µm to about 75 µm, or about 70 µm to about 200 µm, or about 60 µm to about 150 µm, or about 150 µm to about 300 µm), wherein D10<D50<D900. The pigmented polymer particles 124/130 may also have a diameter span of about 0.2 to about 10 (or about 0.2 to about 0.5, or about 0.4 to about 0.8, or about 0.5 to about 1.0, or about 1 to about 3, or about 2 to about 5, or about 5 to about 10). Without limitation, diameter span values of 1.0 or greater are considered broad, and diameter spans values of 0.75 or less are considered narrow.

In a first nonlimiting example, the pigmented polymer particles 124/130 may have a D10 of about 0.1 µm to about 10 µm, a D50 of about 0.5 µm to about 25 µm, and a D90 of about 3 µm to about 50 µm, wherein D10<D50<D90. Said pigmented polymer particles 124/130 may have a diameter span of about 0.2 to about 2.

In a second nonlimiting example, the pigmented polymer particles 124/130 may have a D10 of about 5 µm to about 30 µm, a D50 of about 30 µm to about 70 µm, and a D90 of about 70 µm to about 120 µm, wherein D10<D50<D90. Said pigmented polymer particles 124/130 may have a diameter span of about 1.0 to about 2.5.

In a third nonlimiting example, the pigmented polymer particles 124/130 may have a D10 of about 25 µm to about 60 µm, a D50 of about 60 µm to about 110 µm, and a D90 of about 110 µm to about 175 µm, wherein D10<D50<D90. Said pigmented polymer particles 124/130 may have a diameter span of about 0.6 to about 1.5.

In a fourth nonlimiting example, the pigmented polymer particles 124/130 may have a D10 of about 75 µm to about 125 µm, a D50 of about 100 µm to about 200 µm, and a D90 of about 125 µm to about 300 µm, wherein D10<D50<D90. Said pigmented polymer particles 124/130 may have a diameter span of about 0.2 to about 1.2.

In a fifth nonlimiting example, the pigmented polymer particles 124/130 may have a D10 of about 1 µm to about 50 µm (or about 5 µm to about 30 µm, or about 1 µm to about 25 µm, or about 25 µm to about 50 µm), a D50 of about 25 µm to about 100 µm (or about 30 µm to about 100 µm, or about 30 µm to about 70 µm, or about 25 µm to about 50 µm, or about 50 µm to about 100 µm), and a D90 of about 60 µm to about 300 µm (or about 70 µm to about 200 µm, or about 60 µm to about 150 µm, or about 150 µm to about 300 µm), wherein D10<D50<D90. The pigmented polymer particles 124/130 may also have a diameter span of about 0.4 to about 3 (or about 0.6 to about 2, or about 0.4 to about 1.5, or about 1 to about 3).

The pigmented polymer particles 124/130 may have a circularity of about 0.9 or greater (or about 0.90 to about 1.0, or about 0.93 to about 0.99, or about 0.95 to about 0.99, or about 0.97 to about 0.99, or about 0.98 to 1.0).

The pigmented polymer particles 124/130 may have an angle of repose of about 25° to about 45° (or about 25° to about 35°, or about 30° to about 40°, or about 35° to about 45°).

The pigmented polymer particles 124/130 may have a Hausner ratio of about 1.0 to about 1.5 (or about 1.0 to about 1.2, or about 1.1 to about 1.3, or about 1.2 to about 1.35, or about 1.3 to about 1.5).

The pigmented polymer particles 124/130 may have a bulk density of about 0.3 $g/cm^3$ to about 0.8 $g/cm^3$ (or about 0.3 $g/cm^3$ to about 0.6 $g/cm^3$, or about 0.4 $g/cm^3$ to about 0.7 $g/cm^3$, or about 0.5 $g/cm^3$ to about 0.6 $g/cm^3$, or about 0.5 $g/cm^3$ to about 0.8 $g/cm^3$).

Depending on the temperature and shear rate of processing 114 and the composition and relative concentrations of the components 102, 104, and 106, different shapes of the structures that compose the pigmented polymer particles 124/130 have been observed. Typically, the pigmented polymer particles 124/130 comprise substantially spherical particles (having a circularity of about 0.97 or greater). However, other structures including disc and elongated structures have been observed in the pigmented polymer particles 124/130. Therefore, the pigmented polymer particles 124/130 may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The pigmented polymer particles 124/130 may have a sintering window that is within 10° C., preferably within 5° C., of the sintering window of the thermoplastic polymer.

Applications of Pigmented Polymer Particles

The pigmented polymer particles described herein may be used to produce a variety of articles. By way of nonlimiting example, 3-D printing processes of the present disclosure may comprise: depositing pigmented polymer particles described herein upon a surface (e.g., in layers and/or in a specified shape), and once deposited, heating at least a portion of the particles to promote consolidation thereof and form a consolidated body (or object). The consolidated body may have a void percentage of about 5% or less (e.g., 0% to about 5%, or about 0.5% to about 2%, or about 1% to about 3%, or about 2% to about 5%) after being consolidated. For example, heating and consolidation of the thermoplastic polymer particles may take place in a 3-D printing apparatus employing a laser, such that heating and consolidation take place by selective laser sintering.

Examples of articles that may be produced by such methods where the pigmented polymer particles may be used to form all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, and the like. Further, particles may be useful in applications that include, but are not limited to, paints, powder coatings, ink jet materials, electrophotographic toners, 3D printing, and the like.

In addition to the pigmented polymer particles described herein may have a specific fingerprint (e.g., color spectrum, phosphorescence, and the like, and any combination thereof) that is useful in identifying objects, tracking objects, authenticating objects, and/or determining the health of objects. Further, the placement of where the pigmented polymer particles or the portion(s) of the object formed therefrom are located in the objects as another layer of fingerprinting the objects for identifying objects, tracking objects, authenticating objects, and/or determining the health of objects.

Methods of identifying objects, tracking objects, authenticating objects, and/or determining the health of objects may include (a) exposing the object comprising or produced from the pigmented polymer particles to an exciting cause (e.g., broad spectrum light, ultraviolet wavelength lights of light, a specific wavelength of light, or the like); (b) sensing one or more spectra related to color and/or phosphorescence; and (c) comparing the spectra to the known spectra for the pigments used in said object or portion thereof. Optionally, the location of where the spectra area is located on the object may be compared to the known location where the spectra area should be. The comparison(s) can be used for identifying and/or authenticating the object. For tracking, the comparison(s) may be done and/or the detected spectra and/or spectra area may be logged into a database along with the physical location of the object. Further, the health of objects that wear and/or crack can be ascertained. For example, a core portion of the article may comprise or be formed from the pigmented polymer particles and an outer portion may cover the core portion and not comprise or be formed from the pigmented polymer particles. Then, the appearance of color and/or phosphorescence may indicate that the object is at or near the end of life.

Example Embodiments

A first nonlimiting example embodiment is a composition comprising: pigmented polymer particles comprising a thermoplastic polymer and a pigment (e.g., colored pigment, metallic pigment, pearlescent pigment, phosphorescent pigment, or any combination thereof) having a melt-emulsified morphology. The first nonlimiting example embodiment may include one or more of: Element 1: wherein the melt-emulsified morphology comprises the pigment has a coating comprising the thermoplastic polymer and the coated pigment adhered to a thermoplastic polymer particle; Element 2: Element 1 and wherein the coating has an emulsion stabilizer coating (e.g., the emulsion stabilizer may be embedded in the coating of the pigment); Element 3: wherein the pigment is embedded in an outer surface of a thermoplastic polymer particle; Element 4: wherein the pigment is encapsulated by a thermoplastic polymer particle; Element 5: the composition further comprising the pigment having a coating and not being adhered to, embedded in, or encapsulated by a thermoplastic polymer particle; Element 6: Element 5 and wherein the coating of the pigment has an emulsion stabilizer coating (e.g., the emulsion stabilizer may be embedded in the coating of the pigment); Element 7: wherein the pigmented polymer particles have a D10 of about 0.1 μm to about 125 μm, a D50 of about 0.5 μm to about 200 μm, and a D90 of about 3 μm to about 300 μm, wherein D10<D50<D90; Element 8: wherein the pigmented polymer particles have a diameter span of about 0.2 to about 10; Element 9: wherein the pigmented polymer particles have a Hausner ratio of about 1.0 to about 1.5; Element 10: wherein the pigmented polymer particles have an emulsion stabilizer coating; Element 11: Element 10 and wherein the emulsion stabilizer comprises nanoparticles and the nanoparticles, and wherein at least some of the emulsion stabilizer is embedded in the outer surface of the pigmented polymer particles; Element 12: Element 10 and wherein at least some of the pigmented polymer particles have a void comprising the emulsion stabilizer at a void/polymer interface; Element 13: Element 12 and wherein the emulsion stabilizer comprises nanoparticles and the nanoparticles are embedded in the void/polymer interface; and Element 14: Element 12 and wherein the void contains the carrier fluid. Examples of combinations include, but are not limited to, Element 1 (optionally in combination with Element 2) in combination with one or more of Elements 3-14; Element 3 in combination with one or more of Elements 4-14; Element 4 in combination with one or more of Elements 5-14; Element 5 (optionally in combination with Element 6) in combination with one or more of Elements 7-14; Element 7 in combination with one or more of Elements 8-14; Element 8 in combination with one or more of Elements 9-14; Element 9 in combination with one or more of Elements 10-14; Element 10 in combination with Element 11 and/or 12 and, when in combination with Element 12 optionally in further combination with Element 13 and/or 14; and two or more of Element 1 (optionally in combination with Element 2), Element 3, Element 4, and Element 5 in combination (optionally in combination with Element 6).

A second nonlimiting example embodiment is a composition comprising: pigmented polymer particles comprising a thermoplastic polymer and a pigment (e.g., colored pigment, metallic pigment, pearlescent pigment, phosphorescent pigment, or any combination thereof) wherein at least some of the pigmented polymer particles have a morphology according to (a), (b), (c), or any combination thereof: (a) the pigment having a coating comprising the thermoplastic polymer and the coated pigment adhered to a thermoplastic polymer particle, (b) the pigment being embedded in an outer surface of the thermoplastic polymer particle, and (c) the pigment being encapsulated by the thermoplastic polymer particle. The second nonlimiting example embodiment may include one or more of: Element 2; Element 5; Element 6; Element 7; Element 8; Element 9; Element 10; Element 11; Element 12; Element 13; and Element 14, including in any of the combinations per the first nonlimiting example embodiment.

A third nonlimiting example embodiment is a method comprising: depositing, upon a surface, the pigmented polymer particles of the first or second nonlimiting example embodiment (optionally in combination with one or more of Elements 1-14) optionally in combination with other thermoplastic polymer particles; and once deposited, heating at least a portion of the particles to promote consolidation thereof and form a consolidated body.

A fourth nonlimiting example embodiment is a method comprising: mixing a mixture comprising a thermoplastic polymer, a carrier fluid that is immiscible with the thermoplastic polymer, a pigment (e.g., colored pigment, metallic pigment, pearlescent pigment, phosphorescent pigment, or any combination thereof), and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form pigmented polymer particles comprising a thermoplastic polymer and a pigment having a melt-emulsified morphology; and separating the pigmented polymer particles from the carrier fluid.

A fifth nonlimiting example embodiment is a method comprising: mixing a mixture comprising a thermoplastic polymer, a carrier fluid that is immiscible with the thermoplastic polymer, a pigment (e.g., colored pigment, metallic pigment, pearlescent pigment, phosphorescent pigment, or any combination thereof), and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form pigmented polymer particles comprising a thermoplastic polymer and a pigment, wherein at least some of the pigmented polymer particles have a morphology according to (a), (b), (c), or any combination thereof: (a) the pigment having a coating comprising the thermoplastic polymer and the coated pigment adhered to a thermoplastic polymer particle, (b) the pigment being embedded in an outer surface of the thermoplastic polymer particle, and (c) the pigment being encapsulated by the thermoplastic polymer particle; and separating the pigmented polymer particles from the carrier fluid.

The fourth or fifth nonlimiting example embodiment may include one or more of: Element 1; Element 2; Element 3; Element 4; Element 5; Element 6; Element 7; Element 8; Element 9; Element 15: wherein the pigment is a first pigment, and wherein the mixture further comprises a second pigment different than the first pigment; Element 16: wherein the pigmented polymer particles comprise 0.01 wt % to 30 wt % of the pigment based on the weight of the thermoplastic polymer in the pigmented polymer particles; Element 17: wherein the emulsion stabilizer is included in the mixture, and wherein the emulsion stabilizer coats at least a portion of an outer surface of the pigmented polymer particles; and Element 18: Element 17 and wherein the emulsion stabilizer is embedded in the outer surface. Examples of combinations include, but are not limited to, two or more of Element 1 (optionally in combination with Element 2), Element 3, Element 4, and Element 5 in combination (optionally in combination with Element 6); one or more of Element 1-6 in combination with one or more of Elements 7-9 and 15-18; Element 7 in combination with one or more of Elements 8-9 and 15-18; Element 8 in combination with one or more of Elements 9 and 15-18; Element 9 in combination with one or more of Elements 15-18; Element 15 in combination with one or more of Elements 16-18; and two or more of Elements 16-18 in combination.

Clauses

Clause 1. A composition comprising: pigmented polymer particles comprising a thermoplastic polymer and a pigment (e.g., colored pigment, metallic pigment, pearlescent pigment, phosphorescent pigment, or any combination thereof) having a melt-emulsified morphology.

Clause 2. The composition of Clause 1, wherein the melt-emulsified morphology comprises the pigment having a coating comprising the thermoplastic polymer and the coated pigment is adhered to an outer surface of a thermoplastic polymer particle.

Clause 3. The composition of Clause 2, wherein the coating has an emulsion stabilizer coating.

Clause 4. The composition of Clause 1, wherein the melt-emulsified morphology comprises the pigment being embedded in an outer surface of a thermoplastic polymer particle.

Clause 5. The composition of Clause 1, wherein the melt-emulsified morphology comprises the pigment being encapsulated by a thermoplastic polymer particle.

Clause 6. The composition of Clause 1 further comprising the pigment having a coating and not being adhered to, embedded in, or encapsulated by with a thermoplastic polymer particle.

Clause 7. The composition of Clause 6, wherein the coating of the pigment has an emulsion stabilizer coating.

Clause 8. The composition of Clause 1, wherein the pigmented polymer particles have a circularity of about 0.90 to about 1.0.

Clause 9. The composition of Clause 1, wherein the pigmented polymer particles have an emulsion stabilizer coating at least a portion of an outer surface of the pigmented polymer particles.

Clause 10. The composition of Clause 9, wherein the emulsion stabilizer comprises nanoparticles and the nanoparticles, and wherein at least some of the emulsion stabilizer is embedded in the outer surface of the pigmented polymer particles.

Clause 11. The composition of Clause 9, wherein at least some of the pigmented polymer particles have a void comprising the emulsion stabilizer at a void/polymer interface.

Clause 12. The composition of Clause 11, wherein the emulsion stabilizer comprises nanoparticles and the nanoparticles are embedded in the void/polymer interface.

Clause 13. The composition of Clause 11, wherein the void contains the carrier fluid.

Clause 14. A method comprising: depositing, upon a surface, the pigmented polymer particles of Clause 1 optionally in combination with other thermoplastic polymer particles; and once deposited, heating at least a portion of the particles to promote consolidation thereof and form a consolidated body.

Clause 15. A composition comprising: pigmented polymer particles comprising a thermoplastic polymer and a pigment (e.g., colored pigment, metallic pigment, pearlescent pigment, phosphorescent pigment, or any combination thereof), wherein at least some of the pigmented polymer particles have a morphology according to (a), (b), (c), or any combination thereof: (a) the pigment having a coating comprising the thermoplastic polymer and the coated pigment adhered to a thermoplastic polymer particle, (b) the pigment being embedded in an outer surface of the thermoplastic polymer particle, and (c) the pigment being encapsulated by the thermoplastic polymer particle.

Clause 16. The composition of Clause 15, wherein (a) morphology is present and the coating of the pigment has an emulsion stabilizer coating.

Clause 17. The composition of Clause 15 further comprising the pigment having a coating and not being adhered to, embedded in, or encapsulated by with a thermoplastic polymer particle.

Clause 18. The composition of Clause 17, wherein the coating of the pigment has an emulsion stabilizer coating.

Clause 19. The composition of Clause 15, wherein the pigmented polymer particles have a circularity of about 0.90 to about 1.0.

Clause 20. The composition of Clause 15, wherein the pigmented polymer particles have an emulsion stabilizer coating at least a portion of an outer surface of the pigmented polymer particles.

Clause 21. The composition of Clause 20, wherein the emulsion stabilizer comprises nanoparticles and the nanoparticles, and wherein at least some of the emulsion stabilizer is embedded in the outer surface of the pigmented polymer particles.

Clause 22. The composition of Clause 20, wherein at least some of the pigmented polymer particles have a void comprising the emulsion stabilizer at a void/polymer interface.

Clause 23. The composition of Clause 22, wherein the emulsion stabilizer comprises nanoparticles and the nanoparticles are embedded in the void/polymer interface.

Clause 24. The composition of Clause 22, wherein the void contains the carrier fluid.

Clause 25. A method comprising: depositing, upon a surface, the pigmented polymer particles of Clause 1 optionally in combination with other thermoplastic polymer particles; and once deposited, heating at least a portion of the particles to promote consolidation thereof and form a consolidated body.

Clause 26. A method comprising: mixing a mixture comprising a thermoplastic polymer, a carrier fluid that is immiscible with the thermoplastic polymer, a pigment (e.g., colored pigment, metallic pigment, pearlescent pigment, phosphorescent pigment, or any combination thereof), and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form pigmented polymer particles comprising a thermoplastic polymer and a pigment having a melt-emulsified morphology; and separating the pigmented polymer particles from the carrier fluid.

Clause 27. A method comprising: mixing a mixture comprising a thermoplastic polymer, a carrier fluid that is immiscible with the thermoplastic polymer, a pigment (e.g., colored pigment, metallic pigment, pearlescent pigment, phosphorescent pigment, or any combination thereof), and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form pigmented polymer particles comprising a thermoplastic polymer and a pigment, wherein at least some of the pigmented polymer particles have a morphology according to (a), (b), (c), or any combination thereof: (a) the pigment having a coating comprising the thermoplastic polymer and the coated pigment adhered to a thermoplastic polymer particle, (b) the pigment being embedded in an outer surface of the thermoplastic polymer particle, and (c) the pigment being encapsulated by the thermoplastic polymer particle; and separating the pigmented polymer particles from the carrier fluid.

Clause 28. The method of Clause 26 or 27, wherein the pigment is a first pigment, and wherein the mixture further comprises a second pigment different than the first pigment.

Clause 29. The method of Clause 26 or 27, wherein the pigmented polymer particles comprise 0.01 wt % to 30 wt % of the pigment based on the weight of the thermoplastic polymer in the pigmented polymer particles.

Clause 30. The method of Clause 26 or 27, wherein the emulsion stabilizer is included in the mixture, and wherein the emulsion stabilizer coating at least a portion of an outer surface of the pigmented polymer particles.

Clause 31. The method of Clause 30, wherein the emulsion stabilizer is embedded in the outer surface.

Clause 32. The method of Clause 26 or 27, wherein the pigmented polymer particles have a D10 of about 0.1 μm to about 125 μm, a D50 of about 0.5 μm to about 200 μm, and a D90 of about 3 μm to about 300 μm, wherein D10<D50<D90.

Clause 33. The method of Clause 26 or 27, wherein the pigmented polymer particles have a diameter span of about 0.2 to about 10.

Clause 34. The method of Clause 26 or 27, wherein the pigmented polymer particles have a circularity of about 0.90 to about 1.0.

Clause 35. The method of Clause 26 or 27, wherein the pigmented polymer particles have a Hausner ratio of about 1.0 to about 1.5.

Clause 36. The method of Clause 26 or 27, wherein the melt-emulsified morphology comprises the pigment having a coating comprising the thermoplastic polymer and the coated pigment is adhered to an outer surface of a thermoplastic polymer particle.

Clause 37. The method of Clause 26 or 27, wherein the melt-emulsified morphology comprises the pigment being embedded in an outer surface of a thermoplastic polymer particle.

Clause 38. The method of Clause 26 or 27, wherein the melt-emulsified morphology comprises the pigment being encapsulated by a thermoplastic polymer particle.

Unless otherwise indicated, all numbers expressing quantities of ingredients, properties such as molecular weight, process conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Control Sample 1-1. To a 500 mL glass reactor 117 g of PDMS (PSF™ 30,000 cSt available from Clearco) was added. Using approximately 20 g of the measured PDMS, a slurry was made by mixing the PDMS with 0.75 g AEROSIL® RX50 fumed silica. This slurry was added to the glass reactor followed by 50 g of polypropylene homopolymer resin (ULTRA HOPP™ 20 from ResMart). The reactor was set to 150 revolutions per minute (rpm) with one P4 shaft and heated to 250° C. Once the temperature was reached, the rpm was increased to 500. After 30 min, the melt was discharged into a metal container containing dry ice. Once the dry ice sublimated, the melt was then washed thrice with heptane and isolated by vacuum filtration. The particles were dried overnight in a vacuum oven at room temperature and then sieved through a 250 μm screen.

Control Sample 1-2. The procedure for Control Sample 1-1 was repeated. The resulting particles were dry blended with 15 wt % pigment powder using a high intensity powder mixer operating at about 13,500 rpm for about 30 seconds. The pigment was GloTech International GT8400 Natural pigment, which has a D50 less than 25 μm.

Sample 1-1. The procedure for Control Sample 1-1 was repeated with the exception that 5 wt % pigment was added after the addition of the RX50 fumed silica and mixed until the reactor reached temperature.

Sample 1-2. The procedure for Sample 1-1 was repeated with the exception that 10 wt % pigment was added.

Sample 1-3. The procedure for Sample 1-1 was repeated with the exception that 15 wt % pigment was added.

Table 1 provides the properties of the produced samples.

TABLE 1

| Property | Control Sample 1-1 | Control Sample 1-2 | Sample 1-1 | Sample 1-2 | Sample 1-3 |
|---|---|---|---|---|---|
| Pigment Loading (wt %) | 0 | 15 (dry blend) | 5 | 10 | 15 |
| D50, unsieved (μm) | 54.4 | 52.5 | 54.2 | 64.7 | 66.2 |
| Span, unsieved | 2.0 | 1.3 | 1.1 | 1.0 | 1.0 |
| D50, sieved (μm) | 52.3 | 48.8 | 53.4 | 64.3 | 65.8 |
| Span, sieved | 1.0 | 1.2 | 0.9 | 0.9 | 0.9 |
| Angle of Repose (°) | 30.4 | 36.6 | 37.5 | 40.2 | 40.4 |

Figure 2:
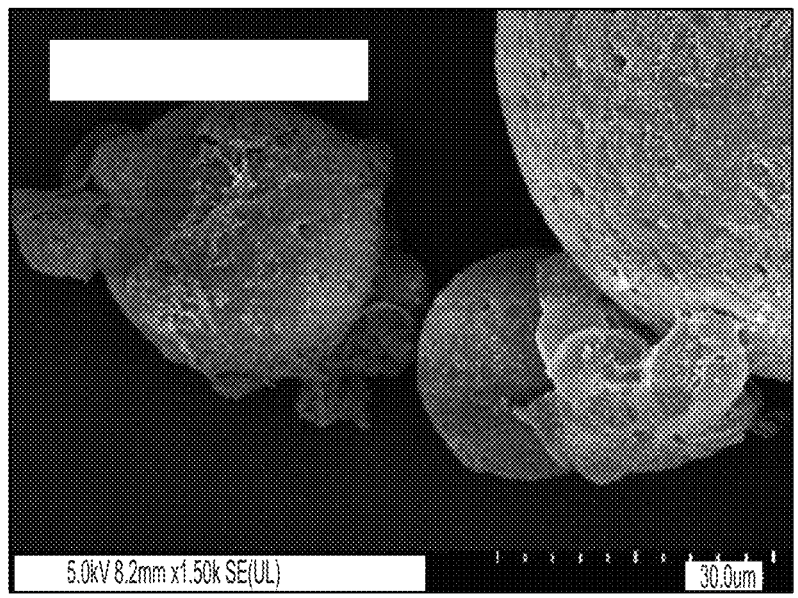
FIGS. 2 and 3 are scanning electron micrographs of Samples 1-2 and 1-3, respectively, illustrating polymer coated pigment being adhered to a surface of the polymer particle.
Figure 3:
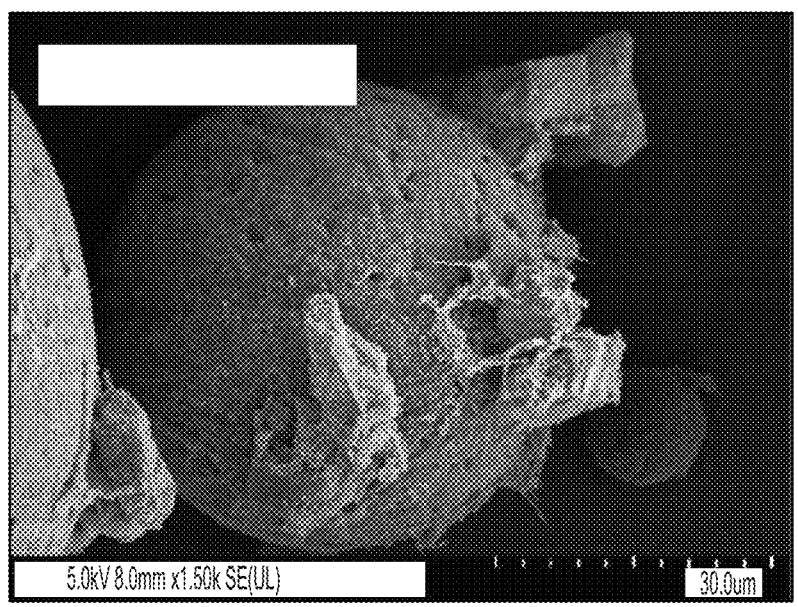
Figure 4:
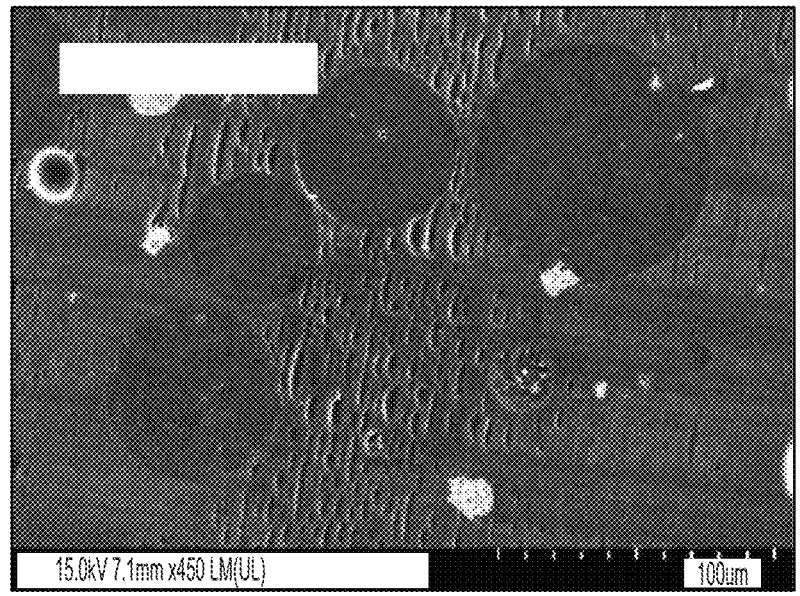
FIGS. 4 and 5 are cross-sectional scanning electron micrographs (samples fixed in epoxy resin and cryo-microtomed before imaging) of Sample 1-2 illustrating (a) pigment not adhered to, embedded in, or encapsulated by a polymer particle and (b) pigment embedded in a surface of a polymer particle.
Figure 5:
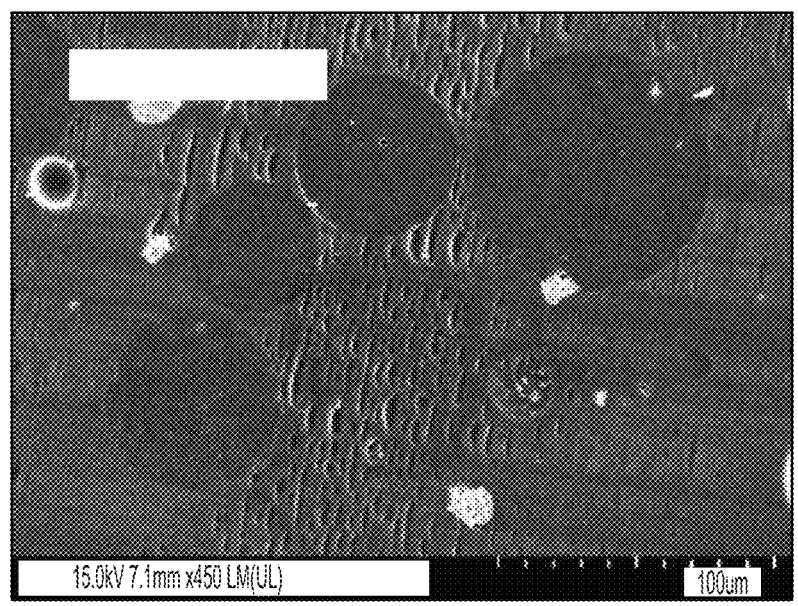

FIGS. 2 and 3 are scanning electron micrographs of Samples 1-2 and 1-3, respectively, illustrating polymer coated pigment being adhered to a surface of the polymer particle. FIGS. 4 and 5 are cross-sectional scanning electron micrographs (samples fixed in epoxy resin and cryo-microtomed before imaging) of Sample 1-2 illustrating (a) pigment not adhered to, embedded in, or encapsulated by a polymer particle and (b) pigment embedded in a surface of a polymer particle.

The samples were 3D printed on a SNOWWHITE SLS printer (available from Sharebot). A 30 mm×30 mm×0.1 mm square was printed as a preliminary screening object. Briefly, the sieved particles were applied onto an aluminum plate using a bar coater (40 mil gap/approximately 1 mm thick layer of powder). The sample was placed in the SNOWWHITE chamber. The motors were disabled since a multilayer object was not printed. The chamber temperature was set to 115° C. Laser rate and laser power were varied to determine optimal print conditions. The chamber and powder bed were cooled to room temperature before the part was removed. Table 2 provides the printing parameters and properties of the resultant printed squares.

TABLE 2

| | Control Sample 1-1 | Control Sample 1-2 | Sample 1-1 | Sample 1-2 | Sample 1-3 |
|---|---|---|---|---|---|
| Laser Rate | 40,000 | 40,000 | 40,000 | 40,000 | 40,000 |
| Laser Power Range | 60%-80% | 35%-70% | 50%-80% | 60%-80% | 60%-80% |
| Percent Void Range | 0.1%-0.9% | 0%-0.2% | 0.5%-3.4% | 0.8%-1.9% | 0.8%-1.4% |
| Edge Curl | 0.6 | 1.3 | 0.8 | 0.4 | 0.4 |

Control Sample 2-1. To a 500 mL glass reactor 117 g of PDMS (PSF™ 30,000 cSt available from Clearco) was added. Using approximately 20 g of the measured PDMS, a slurry was made by mixing the PDMS with 0.75 g AEROSIL® RX50 fumed silica. This slurry was added to the glass reactor followed by 50 g of polypropylene homopolymer resin (ULTRA HOPP™ 20 from ResMart). The reactor was set to 150 revolutions per minute (rpm) with one P4 shaft and heated to 250° C. Once the temperature was reached, the rpm was increased to 500. After 30 min, the melt was discharged into a metal container containing dry ice. Once the dry ice sublimated, the melt was then washed thrice with heptane and isolated by vacuum filtration. The particles were dried overnight in a vacuum oven at room temperature and then sieved through a 250 µm screen.

The resulting particles were dry blended with 15 wt % pigment powder using a high intensity powder mixer operating at about 13,500 rpm for about 30 seconds. The pigment was ULTRAGLOW™ pigment (europium-based phosphorescent powder, available from Aqua Glow), which has a D50 of about 28 µm.

Sample 2-1. The procedure for Control Sample 2-1 was repeated with the exception that 15 wt % pigment was added after the addition of the RX50 fumed silica and mixed until the reactor reached temperature.

Table 3 provides the properties of the produced samples.

TABLE 3

| Property | Control Sample 2-1 | Sample 2-1 |
| --- | --- | --- |
| Pigment Loading (wt %) | 15 (dry blend) | 15 |
| D50, unsieved (µm) | couldn't measure | 91.8 |
| Span, unsieved | couldn't measure | 1.4 |
| D50, sieved (µm) | couldn't measure | 92.4 |
| Span, sieved | couldn't measure | 1.0 |
| Angle of Repose (°) | didn't measure | 41.0 |

A 30 mm×30 mm×0.1 mm square was printed as described above for Sample 2-1 with a SNOWWHITE SLS printer. There was not enough of Control Sample 2-1 for printing. Table 4 provides the properties of the resultant printed squares.

TABLE 4

| | Sample 2-1 |
| --- | --- |
| Laser Rate | 40,000 |
| Laser Power Range | 80%-85% |
| Percent Void Range | 2.8%-6.3% |
| Edge Curl | 0.4 |

Sample 3-1. To a 500 mL glass reactor 117 g of PDMS (PSF™ 10,000 cSt available from Clearco) was added. Using approximately 20 g of the measured PDMS, a slurry was made by mixing the PDMS with 0.5 g AEROSIL® RX50 fumed silica. This slurry was added to the glass reactor followed by 15 wt % pigment (GT8400 Natural pigment, available from GloTech International) and 50 g of polyamide-12 homopolymer resin (RTP 200 F, available from RTP). The reactor was set to 250 revolutions per minute (rpm) and heated to 220° C. Once the temperature was reached, the rpm was increased to 1000. After 30 min, the melt was allowed to cool on the bench. Once cooled, the melt was then washed thrice with heptane and isolated by vacuum filtration. The particles were dried overnight in a vacuum oven at room temperature and then sieved through a 250 µm screen.

Table 5 provides the properties of the produced samples.

TABLE 5

| Property | Sample 3-1 |
| --- | --- |
| Pigment Loading (wt %) | 15 |
| D50, unsieved (µm) | 162.0 |
| Span, unsieved | 2.7 |
| D50, sieved (µm) | 130.0 |
| Span, sieved | 1.3 |
| Angle of Repose (°) | 30.1 |

Figure 6:
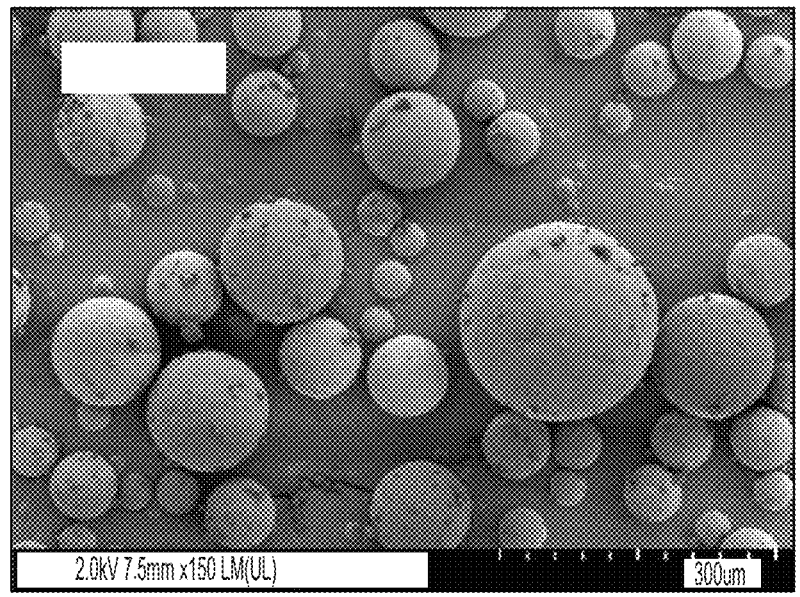
FIGS. 6 and 7 are scanning electron micrographs of Sample 3-1 illustrating what is likely polymer coated pigment being adhered to a surface of the polymer particle.
Figure 7:
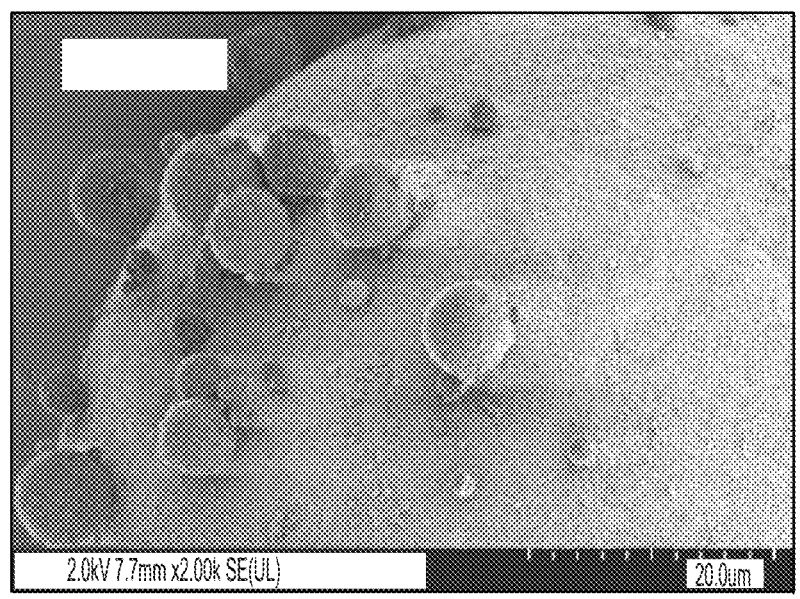
Figure 8:
FIGS. 8 and 9 are cross-sectional scanning electron micrographs (samples fixed in epoxy resin and cryo-microtomed before imaging) illustrating (a) pigment embedded in a surface of the polymer particle and (b) pigment encapsulated in the polymer particle.
Figure 9:
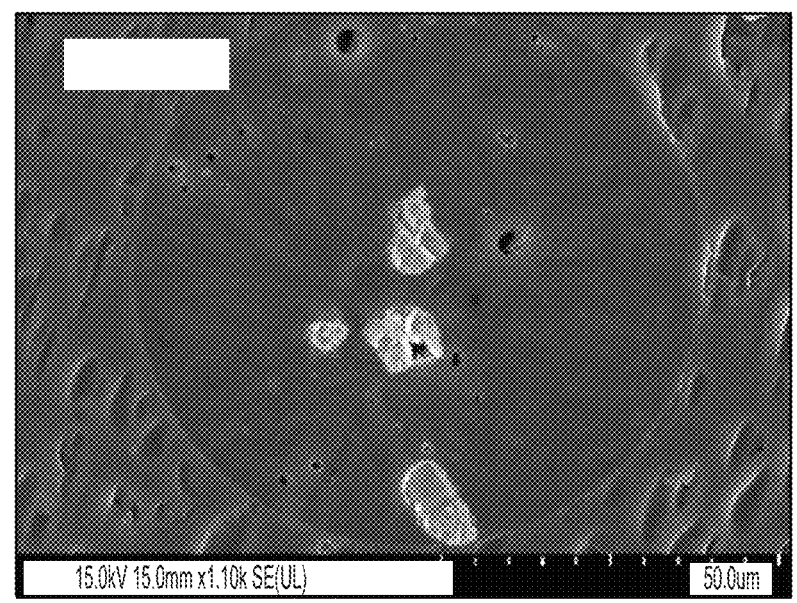

FIGS. 6 and 7 are scanning electron micrographs of Sample 3-1 illustrating what is likely polymer coated pigment being adhered to a surface of the polymer particle. FIGS. 8 and 9 are cross-sectional scanning electron micrographs (samples fixed in epoxy resin and cryo-microtomed before imaging) illustrating (a) pigment embedded in a surface of the polymer particle and (b) pigment encapsulated in the polymer particle. Energy dispersive x-ray spectroscopy of FIG. 9 the encapsulated particles comprise strontium and are, therefore, the pigment.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:
1. A method comprising:
   providing a mixture comprising a thermoplastic polymer, a carrier fluid that is immiscible with the thermoplastic polymer, a pigment, and an emulsion stabilizer;
      wherein the emulsion stabilizer comprises nanoparticles selected from the group consisting of oxide nanoparticles, polymer nanoparticles, and any combination thereof;
   applying shear to the mixture at a temperature greater than a melting point or softening temperature of the ther- moplastic polymer and at a shear rate sufficiently high to disperse the thermoplastic polymer in the carrier fluid as droplets;

cooling the mixture to below the melting point or softening temperature of the thermoplastic polymer to form pigmented polymer particles comprising the thermoplastic polymer, the pigment, and the nanoparticles, wherein the nanoparticles are coated upon an outer surface of the pigmented polymer particles, and wherein at least some of the pigmented polymer particles have a morphology according to (a), (b), (c), or any combination thereof:

(a) the pigment being coated by the thermoplastic polymer to define a coated pigment, and the coated pigment being adhered to the outer surface, (b) the pigment being embedded in the outer surface, and (c) the pigment being encapsulated by the thermoplastic polymer below the outer surface; and separating the pigmented polymer particles from the carrier fluid;

wherein the pigmented polymer particles have a D10 of about 0.1 μm to about 125 μm, a D50 of about 0.5 μm to about 200 μm, and a D90 of about 3 μm to about 300 μm, wherein D10<D50<D90.

2. The method of claim 1, wherein the pigment comprises a first pigment and a second pigment that are different from one another.

3. The method of claim 1, wherein the pigmented polymer particles comprise 0.01 wt % to 30 wt % of the pigment based on a weight of the thermoplastic polymer in the pigmented polymer particles.

4. The method of claim 1, wherein the nanoparticles are embedded in the outer surface.

5. The method of claim 1, wherein the pigmented polymer particles have a diameter span of about 0.2 to about 10.

6. The method of claim 1, wherein the pigmented polymer particles have a circularity of about 0.90 to about 1.0.

7. The method of claim 1, wherein the pigmented polymer particles have a Hausner ratio of about 1.0 to about 1.5.

8. The method of claim 1, wherein the nanoparticles comprise silica nanoparticles.

9. A method comprising:

providing a mixture comprising a thermoplastic polymer, a carrier fluid that is immiscible with the thermoplastic polymer, a pigment, and an emulsion stabilizer;

wherein the emulsion stabilizer comprises nanoparticles selected from the group consisting of oxide nanoparticles, polymer nanoparticles, and any combination thereof; and wherein the carrier fluid is selected from the group consisting of a silicone oil, a fluorinated silicone oil, a perfluorinated silicone oil, a polyethylene glycol, an alkyl-terminal polyethylene glycol, tetraethylene glycol dimethyl ether, a paraffin, a liquid petroleum jelly, a vison oil, a turtle oil, a soya bean oil, perhydrosqualene, a sweet almond oil, a calophyllum oil, a palm oil, a parleam oil, a grapeseed oil, a sesame oil, a maize oil, a rapeseed oil, a sunflower oil, a cottonseed oil, an apricot oil, a castor oil, an avocado oil, a jojoba oil, an olive oil, a cereal germ oil, an ester of lanolic acid, an ester of oleic acid, an ester of lauric acid, an ester of stearic acid, a fatty ester, a fatty acid, a fatty alcohol, a polysiloxane modified with fatty acids, a polysiloxane modified with fatty alcohols, a polysiloxane modified with polyoxyalkylenes, and any combination thereof;

applying shear to the mixture at a temperature greater than a melting point or softening temperature of the thermoplastic polymer and at a shear rate sufficiently high to disperse the thermoplastic polymer in the carrier fluid as droplets;

cooling the mixture to below the melting point or softening temperature of the thermoplastic polymer to form pigmented polymer particles comprising the thermoplastic polymer, the pigment, and the nanoparticles, wherein the nanoparticles are coated upon an outer surface of the pigmented polymer particles, and wherein at least some of the pigmented polymer particles have a morphology according to (a), (b), (c), or any combination thereof:

(a) the pigment being coated by the thermoplastic polymer to define a coated pigment, and the coated pigment being adhered to the outer surface, (b) the pigment being embedded in the outer surface, and (c) the pigment being encapsulated by the thermoplastic polymer below the outer surface; and separating the pigmented polymer particles from the carrier fluid.

10. The method of claim 1, wherein the pigmented polymer particles have a diameter span of about 0.2 to about 1.2.

* * * * *